United States Patent [19]

Hersh

[11] 4,363,893
[45] Dec. 14, 1982

[54] SHOE POLISH

[76] Inventor: David Hersh, 8599 Venice Blvd., Los Angeles, Calif. 90034

[21] Appl. No.: 287,528

[22] Filed: Jul. 27, 1981

[51] Int. Cl.$^3$ ................................................. C08K 5/05
[52] U.S. Cl. ......................................... 524/376; 106/3
[58] Field of Search ................. 260/29.6 ME, 29.6 R; 106/3; 524/376

[56] References Cited

U.S. PATENT DOCUMENTS

| | | | |
|---|---|---|---|
| 2,046,886 | 7/1936 | Strain | 91/68 |
| 2,191,520 | 2/1940 | Crawford et al. | 260/83 |
| 2,511,695 | 6/1950 | Canfield | 260/28.5 |
| 2,575,553 | 11/1951 | Kolvoort | 260/29.6 |
| 2,849,319 | 8/1958 | Weinmann et al. | 99/169 |
| 2,978,372 | 4/1961 | Linden et al. | 154/43 |

Primary Examiner—Joseph L. Schofer
Assistant Examiner—Bernard Lipman
Attorney, Agent, or Firm—Christie, Parker & Hale

[57] ABSTRACT

A composition useful as a shoe polish comprises an acrylic resin, a plasticizer, deionized water, and preferably a trace amount of an alcoholic cosolvent. In its preferred form, the composition does not require wax, and may be applied directly on articles having a wax coating.

9 Claims, No Drawings

SHOE POLISH

FIELD OF THE INVENTION

This invention relates to a composition, in particular, a liquid plastic shoe coating which does not require wax for providing luster, and which can be applied directly on shoes which had previously received a wax polish.

BACKGROUND OF THE INVENTION

One of the problems afflicting shoe polishes is providing, on a flexible surface, a protective finish which is both lustrous and water resistant. Shoe polishes containing wax have been used with temporary success to accomplish these ends. Wax is particularly disadvantageous because it tends to lose luster after exposure to moisture from rain, water splash or puddles. Thus, it is necessary to reapply a wax-based shoe polish frequently in order to properly protect shoe or boot leather.

A further disadvantage of wax-containing shoe polishes is that, upon reapplication, the wax from the underlying layer of polish is resistant to accepting a new layer of polish. Thus, vigorous buffing is necessary in order for a new layer of polish to properly "take" on the leather.

There is need for a composition useful as a shoe polish which provides high luster, has high water resistance, and can be applied directly over wax-based polishes without requiring vigorous buffing.

SUMMARY OF THE INVENTION

To satisfy the above needs, there is provided a composition useful as a shoe polish which does not require wax and can be used on shoes having already received a wax based polish. The composition resembles a liquid plastic coating and in a presently preferred embodiment, comprises about 15% to about 25%, preferably 20% by weight acrylic resin, about 6% to about 10% by weight plasticizer for such resin, a trace of alcoholic cosolvent, the balance by weight being primarily water. If desired, about 1% by weight black dye, or about ½% by weight brown dye, can be added for coloration.

In the presently preferred embodiment of the invention, the acrylic resin comprises a stable suspension of polymethyl methacrylate, the plasticizer comprises butyl cellosolve, and the cosolvent comprises diacetone alcohol in trace amounts.

DETAILED DESCRIPTION

The composition of the present invention is effective for providing a lustrous coating on both flexible and rigid substrates which do not require wax, and has utility as a coating on substrates having already received a waxed based protective coating.

By "leather" is meant natural leather and any of the synthetic materials used by those skilled in the art for covering shoes, boots, footwear and saddles.

In its presently preferred use, the composition is applied as a thin film to shoes, boots, gloves or the like, and permitted to air dry to form a protective film, which occurs within about 2 to about 5 minutes. If desired, the substrate can be lightly buffed to speed up the drying process, but this is not necessary.

The resin component is present as about 15% to about 25% by weight of the entire composition and preferably comprises a stable suspension of a low weight acrylic resin. In a particularly preferred composition, the resin component is present as about 20% by weight of the entire composition. Suitable resins include polymethyl methacrylate, ethyl methacrylate, propyl methacrylate, n-butyl methacrylate, and isobutyl methacrylate. Preferably the acrylic resin portion of the composition contains sufficient agents or emulsifiers for keeping the resin in a stable suspension or emulsion until it is applied to the substrate. One such particularly preferred acrylic resin is a commercially prepared resin marketed under the trademark ROPLEX WL 81 available from the Rohm & Haas Co. The ROPLEX WL 81 resin is about 20% solids by weight.

It is possible to employ a copolymeric suspension as the acrylic resin component of the composition, as long as the copolymers ae in proportions of 1:1 to about 1:10 and are selected from the group of low weight methacrylates or acrylates (methyl, ethyl, prophyl, n-butyl, and isobutyl).

The plasticizer softens the acrylic resin. The plasticizer also aids adhesion of the composition to a flexible substrate such as leather. It is presently preferred to employ about 6% by weight to about 10% by weight plasticizer, preferably about 8%. Above 10%, the composition tends to become gummy and difficult to dry, while below 6%, the composition does not "take" sufficiently to the substrate and tends, after application, to come off in the form of flakes.

Butyl cellosolve is the presently preferred plasticizer for use with compositions utilizing polymethyl methacrylate as a primary component of the acrylic resin. Although butyl cellosolve is known to be volatile under normal atmospheric conditions, surprisingly it remains in the composition as a permanent plasticizer during solvent evaporation, as when a film of the composition is applied to shoe leather and allowed to dry.

Other plasticizers, such as butyl carbitol, dimethyl phthalate, and dibutal phthalate may also be used.

The plasticizer also may function as a solvent for wax. Although the composition does not require wax, and it is preferred that the composition not contain wax, the capability of the plasticizer to act as a solvent for wax is particularly advantageous because the composition may be accepted directly on previously waxed surfaces and provide a high luster without requiring extensive buffing.

The composition preferably, although not necessarily contains a small amount or trace of a low molecular weight alcoholic cosolvent. The alcoholic cosolvent may increase stability of the composition by accommodating both polar and non-polar liquids during evaporation of the film. Without intending to be bound by theory, it is believed that the alcoholic cosolvent functions as a solvent for water and wax, and that presence of trace concentrations of alcohol may help coalesce particles of the acrylic resin in suspension as the composition "takes" to the surface of shoe leather.

In the presently preferred embodiment, diacetone alcohol is employed as a cosolvent as a trace component, preferably in a concentration less than about 1% by weight. However, it is possible to utilize an alcoholic cosolvent in concentrations of up to about 5% by weight.

The balance of the composition comprises primarily water. This component is preferably about 70% by weight. Water concentrations greater than about 77% leave a thin film on a substrate with little luster. On the other hand, concentrations below about 67% leave a thick film on the substrate which dries too slowly. As water is a polar solvent, it can accommodate polar molecules present in the composition. Preferably the water is deionized water to insure uniformity of the composition, and because substantial concentrations of cations can deleteriously effect the stability of the composition. In practice, the composition is typically applied as a film and the water is permitted to evaporate. The lustrous coating remaining after evaporation is resistant to future attack by water or other polar media.

A dye can be added to the composition, if desired, for coloration. About 1% by weight conventional black dye or about ½% by weight conventional brown dye is sufficient for this purpose.

If desired, defoamers, viscosity improvers, or buffers known to those skilled in the art may be added as minor components with the water.

The composition does not require wax and can be applied directly over waxed finishes without requiring extensive buffing. Although the reason is not perfectly understood, this property may in part be due to the presence of the plasticizer in the composition.

EXAMPLE

A presently preferred composition contains by weight:
about 20% acrylic resin (polymethyl methacrylate)
about 8% plasticizer (butyl cellosolve)
up to 1% (trace) diacetone alcohol
balance deionized water.

What is claimed is:
1. A composition comprising:
   about 15% to about 25% by weight acrylic resin dispersion;
   about 6% to about 10% butyl cellosolve; and
   the balance deionized water.
2. A composition according to claim 1 wherein the acrylic resin comprises polymethyl methacrylate.
3. A composition according to claim 1 wherein the acrylic resin solution comprises a copolymeric solution of polymethyl methacrylate with n-butyl acrylate in equal proportions.
4. A composition according to claim 1 further comprising up to about 5% alcoholic cosolvent.
5. A composition according to claim 4 wherein the alcoholic cosolvent comprises diacetone alcohol.
6. A composition according to claim 5 wherein the diacetone alcohol is present in trace amounts, and comprises less than about 1% by weight of the composition.
7. A composition according to claim 1 which is essentially free of wax content.
8. A shoe polish consisting essentially of:
   about 20% by weight polymethyl methacrylate;
   about 8% by weight butyl cellosolve;
   about 72% by weight deionized water; and
   a trace concentration of diacetone alcohol.
9. A shoe polish according to claim 8 including up to about 1% colored dye.

* * * * *